Feb. 19, 1957  E. E. MOUNTZ  2,781,624
ROTARY ROW CROP BEATER
Filed Oct. 12, 1953  2 Sheets-Sheet 1

INVENTOR.
ELTON M. MOUNTZ
BY William H. Bender
ATTORNEY

Feb. 19, 1957 E. E. MOUNTZ 2,781,624
ROTARY ROW CROP BEATER
Filed Oct. 12, 1953 2 Sheets-Sheet 2

INVENTOR.
ELTON M. MOUNTZ
BY William H Bendey
ATTORNEY

United States Patent Office 2,781,624
Patented Feb. 19, 1957

2,781,624

ROTARY ROW CROP BEATER

Elton E. Mountz, Joanna, Pa.

Application October 12, 1953, Serial No. 385,553

2 Claims. (Cl. 55—118)

This invention relates to agricultural machines, and more particularly to machines of the tractor drawn type, having weed destroying means mounted thereon.

An important object of this invention is to provide a power operated device of this type embodying a plurality of beaters mounted to follow the configuration of the ground supporting row crops.

Another object of the invention is to provide a device of this character which is operably adjustable relative to the hill of row crops and maintain thorough beating of the troughs between the hills.

The present invention comprises generally a frame support mounted on adjustable wheel means pivotally mounted for easy and accurate tracking. Well known connecting means equip the forward end of the frame for easy connection to standard tractors. Journaled on the frame, and a transverse divider separating the same into two sections, are a plurality of flail rotary beaters arranged in staggered formation and aligned with the hills and valleys of row-crop planting. These in the forward section are mounted at approximately the third divisional points of the frame width, while those in the rear occupy approximately the quarter points of this dimension. This spacing is dictated by the row spacing used generally in row-crop planting. A hood covers the beaters and partially supports the necessary driving mechanism which is, in turn, connected by conventional means to the tractor's power take-off. Additional connectors between the tractor and the device to facilitate operation, complete the mechanism.

A more detailed description of the invention affording a complete understanding of the elements and their co-operation follows, with specific reference to the drawing in which—

The success of row-crop beaters of the type disclosed depends on proximity to the ground and conformation to the hills and valleys forming the crop surface. A satisfactory device should be capable of primary adjustment to follow the ground configuration, with means to make operational changes particularly in height over the crop rows.

Figure 1:
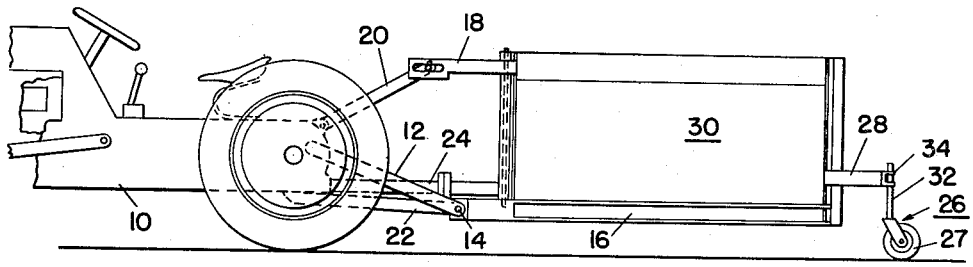
Figure 1 is a side elevational view of the device shown attached to the rear end of a tractor.

Referring now to the drawings, the rear part of a conventional tractor 10 is shown in Figure 1 supporting the front end of the beater device. A preferred form of tractor connection will permit of vertical adjustment during operation. The purpose of such operational control will be evident to those versed in the art after reading the detailed description of the device which follows. However, as such control is a characteristic of the towing device the hitch of the mechanism here described and claimed will facilitate such desired operation. Further expedients of a mechanical nature not requiring invention to obtain such control will be evident to those who use such mechanisms and require no further reference.

Figure 2:
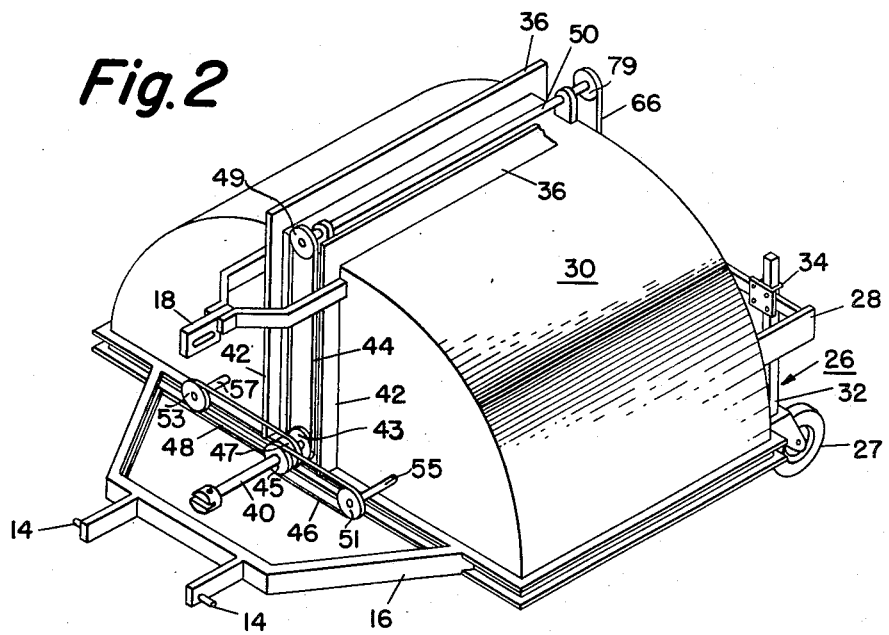
Figure 2 is an enlarged front perspective view of the device.

Continuing the reference to Figure 1 and the illustrated tractor 10, a three-point suspension is indicated as one embodiment. The lower tractor lifts 12 engage lugs 14 on each side of the frame 16, which supports the beater mechanism. A third point connection is made at a slotted member 18 supported at the top of the beater and projected forward thereof as shown in Figure 2. The member 18 is engaged by a connector 20, which links the tractor 10 and the top of the beater device together. In addition to the three point linkage described, conventional side sway braces 22 are used to align the beater during operation. The remaining connection between the tractor and the beater device is the power connection 24 which will be referred to again later, in connection with the beater operation.

Figure 3:
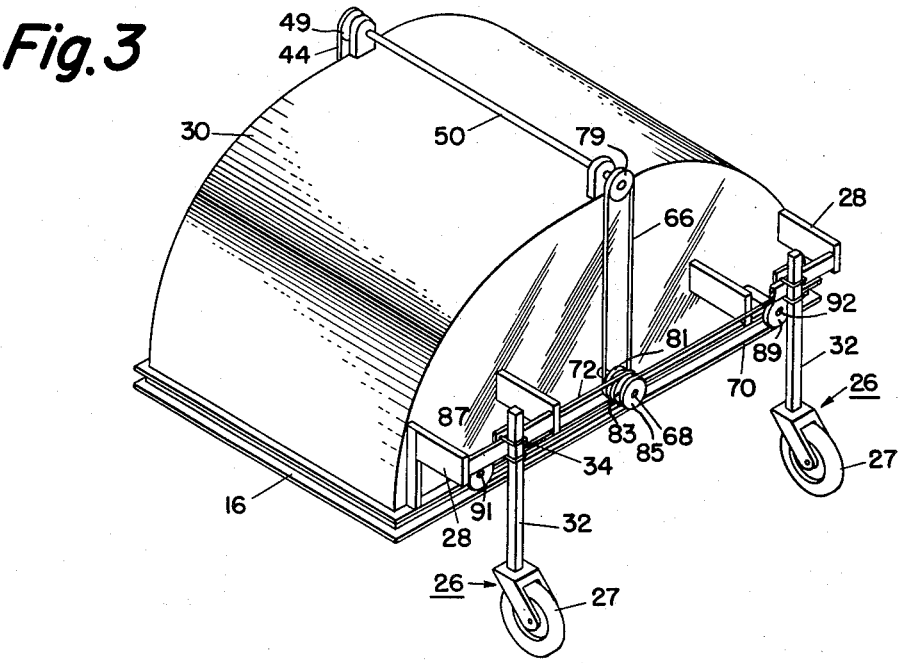
Figure 3 is a rear perspective view of the device.

An adjustable fixed support, in contrast with the operational adjustment noted above which can be applied from the draft vehicle, is supplied by the adjustable wheel means 26 mounted on the rear of the frame as shown in Figures 1 and 3. The wheels 27 are pivotally mounted for easy and accurate tracking and project downwardly from brackets 28 extending rearwardly of the hood 30. Mounting legs 32 to which the wheels are pivotally attached, are clamped to the brackets by U bolts 34 making the fixed vertical and horizontal adjustment easy and rapid.

The hood 30 is shaped with curved sides to better receive and deflect the debris raised in the beater operation. It is securely fastened to the rectangular frame 16 and in turn assists in aligning vertical members arranged on each end to support the drive elements as shown in Figure 2. A pair of stiffeners 36—36 are placed longitudinally across the top of the hood 30 to shield the drive transfer member passing between them and in turn to secure the vertical members placed on opposite ends of the hood.

Figure 4:
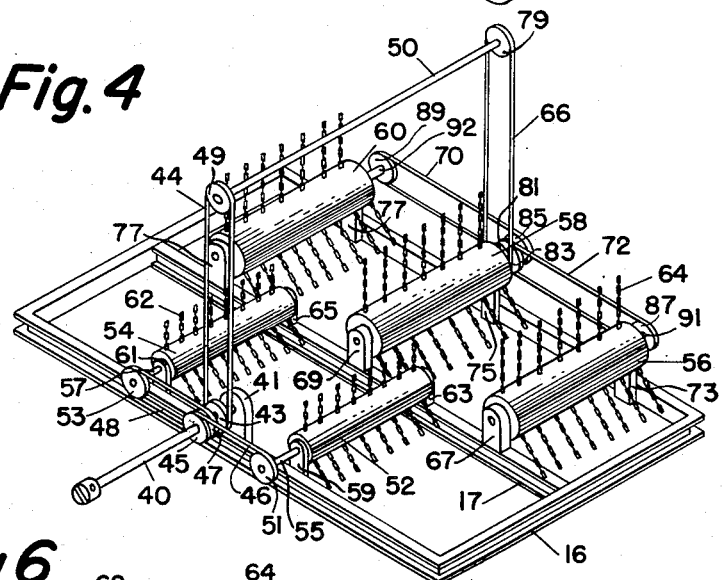
Figure 4 is a front perspective view of the device from above with the hood removed to expose the main frame and flailing members.

The power take-off 24 of the tractor indicated in Figure 1, is coupled with the drive shaft 40 shown in Figures 2 and 4 which is supported between vertical supports 42 on the front end of hood 30 as by bearing 41 (Figure 4). On drive shaft 40, three drive wheels 43, 45 and 47 are positioned to engage drive elements 44, 46 and 48 which operably engage cooperating drive wheels 49, 51 and 53 in driving arrangement. Drive wheels 49, 51 and 53 mounted on shafts 50, 55 and 57 respectively transmit the power of drive shaft 40 for the beating operation. The forward beaters 52 and 54 are supported as by forward brackets 59 and 61 fastened to the frame 16 and by the rear brackets 63 and 65 fastened to the cross member 17 to permit rotation, as shown in Figure 4. These beaters 52 and 54 are spaced apart relative to each other and the beaters 56, 58 and 60 mounted in the rear of the frame 16, and are positioned to be over the hills of the row crops. Beaters 56, 58 and 60 are similarly mounted in rotatable position. Brackets 67, 69 and 71 extend upwardly from cross member 17 to position the forward ends of these beaters while brackets 73, 75 and 77 extend upwardly from the rear of frame 16 to position the other end of the beaters. The forward beaters 52 and 54 are smaller in diameter than the three beaters to the rear, their flails 62, here shown as chains, are also shorter for better control over the crop. The flails 64 of the three rear beaters are longer and may be of heavier construction to better clear the valleys between the crop rows. Increasing the diameter of beaters 56, 58 and 60 insures deeper penetration between the crop rows and harder cleaning action.

In rotating the upper drive shaft 50 from the stub shaft 40, a source of power for the three rear beaters 56, 58 and 60 is supplied which is coordinated in speed and rotational direction. As will be explained later in describing the operation of the device, this is considered an important function. In Figures 3 and 4, drive wheel 79 on the rear of shaft 50 engages drive element 66 which in turn passes around drive wheel 81 on shaft 68. The drive motion thus conveyed to shaft 68 rotates drive wheels 83 and 85 on the same shaft positioned to engage drive elements 72 and 70 respectively. These drive elements 72 and 70 in turn engage drive wheels 87 and 89 to drive the larger, rear beaters 56 and 60 mounted on their respective shafts 91 and 93. The drive of all the beaters contained in the device is thus achieved by means external of the beater chamber as enclosed by hood 30.

Those versed in the art will understand the operation of the disclosed device from the above description of the elements and their cooperating positions. However, to indicate the improvement of this device over those presently known, the operation will be described with reference to all the figures of the drawing discussed thus far, considering Figures 5 and 6 in addition.

It will be understood that the device can be pulled by any draft vehicle and adjusted to obtain excellent results. Easiest and best pulling conditions are obtained, however, by using a tractor equipped with hydraulic lift facilities and arranged to fasten the device at three points of suspension as above described. Such draft vehicles are well known and readily available. As this is the preferred construction, as has previously been indicated, it will be further considered in giving an example of operation.

Figure 6:
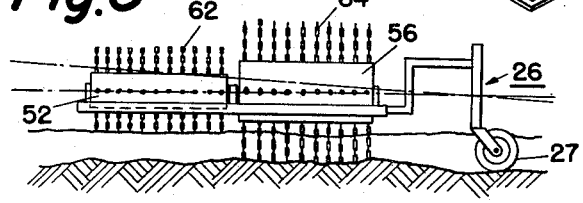

After the lower lifts 12 of the tractor, power take-off 24 and the third point, slotted member 18, are connected, the device is ready for movement to the field of operation. Upward and downward movement of the towing connection of frame 16 will raise the frame on the rear wheels 26, as indicated in Figure 6 by the alternate position of the center line, in pivotal movement about the lugs 14 within the limits of the slot length in member 18. Further lift of the elevating mechanism moves the connection of member 20 to the end of the slot in member 18 and will lift the device from the ground. This is of advantage where operating in narrow turns or against fences and other obstacles.

On arriving at the row planted field for the beater operation, the fixed adjustment of the device is made by raising or lowering the rear wheels 26 by lengthening or shortening the mounting legs 32 as held by the U bolts 34 and horizontal adjustment of the wheel means 26 to row spacing. Variations in types of crops planted requires such adjustment in order to place the wheels 27 in the valleys of the crop rows for proper tracking. This adjustment forms an operating basis for the elevation of the beater means above the ground and should be made with the lifting facilities for the forward end in approximately a middle or neutral position capable of further depression, but more desirable, capable of additional lift where the hill beaters are in the forward section.

Figure 5:
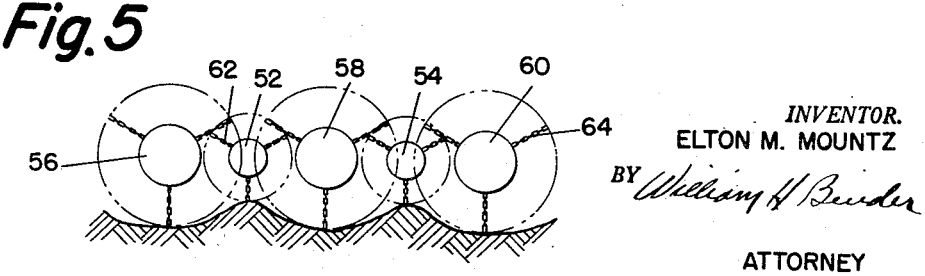
Figures 5 and 6 are schematic views showing the improved operating characteristics of the device, taken from the rear and side of the device as presented in Figure 1, respectively.

Movement over a few yards of the row crop area will indicate further adjustments. If necessary, the rear of the device can be raised or lowered to increase or decrease the cleaning action in the valleys between the hills. The operating characteristics and effect of these adjustments are indicated in Figures 5 and 6. The change in the position of the beater center line in Figure 5 shows the effect of the operational adjustment from any fixed adjustment previously made in the wheel means. Figure 5 is a rear view of the beaters as they engage the hills and valleys of the row crops. Once determined, alteration of the height of the forward end of the device will have little effect on the valley cleaning action in the operation of the device shown.

Turning now to the control and adjustment of the forward beaters here positioned over the hills in which the crops are planted, the reduced operating diameters of beaters 52 and 54 and shortened chains 62 start these elements at increased height. Should the action be too violent, however, raising the front end adjusts the depth of beater action over the crop rows. As has been inferred, this change over the crop does not affect the valley cleaning action.

The advantage of uniform speed and same direction of rotation of the beaters is to coordinate the movement of the debris throughout the whole device. Once lifted and moved the debris, weeds, sticks, stones, etc. will be continued in movement without interruption through the synchronized speed and rotation direction. Further such synchronized operation, coupled with the staggered, tandem arrangement of the beaters aligned with the rows of the crops in addition to improved cleaning results, reduces vibration strain permitting lighter operating members operable with reduced power.

Although a preferred embodiment of the device is disclosed in the specification and drawing, it is readily seen that many substitutions and changes may be made within the limits of the invention. Shifting the beaters to be closer or wider spaced, or in some instances omitting or adding beaters, as determined by row spacing and the type of crop to be beaten, would not affect the spirit of the invention as here defined. The outstanding features of this invention are in the beater placement relative to the row crop, the alignment with the crop and the separation of hill and valley beaters into sections, permitting adjustable control during operation.

Thus a device is provided which is directly effective in the areas requiring beating and easily controlled where light beating is necessary. By arranging the beaters parallel to the row of the crops, dividing them for specific operations, and controlling their elevations by fixed and alterable means, a mechanism achieving the required operation is produced.

I claim:

1. A row crop beater adapted to be drawn by a draft vehicle comprising a frame having forward and rear end members connected by side members and supporting a hood thereon, a dividing member fixed in the side members of the frame providing forward and rear sections therein, a plurality of rotatable flail beaters mounted longitudinally of the frame in the forward frame section operably supported by the forward end member and the dividing member, said beaters spaced and aligned to conform with the hills of the row crops, and a plurality of rotatable flail beaters supported by the dividing member and the rear end member in the rear frame section mounted in staggered relation with the beaters in the forward frame section and being aligned and positioned to beat the valleys of the row crops between the hills, vertically adjustable tracking wheels attached to the rear end member of the frame for operational adjustment, and driving means operatively associated with and adapted to rotate said beaters.

2. A row crop beater adapted to be drawn by a draft vehicle comprising a frame substantially rectangular in shape supporting a hood thereon, having a support member extending across and longitudinally dividing the frame into forward and rear sections, a plurality of rotatable flail beaters mounted longitudinally of the frame in one of said sections operably supported by the frame and the dividing member, said beaters spaced and aligned to conform with the hills of the row crops, and a plurality of rotatable flail beaters supported by the dividing member and the frame in the other section mounted in staggered relation with the hill beaters and being aligned and positioned to beat the valleys of the row crops between the hills, vertically adjustable tracking wheels attached to the rear end member of the frame for operational adjustment, and driving means operatively associated with and adapted to rotate said beaters.

References Cited in the file of this patent

UNITED STATES PATENTS

| | | |
|---|---|---|
| 1,030,156 | Bermes | June 18, 1912 |
| 1,870,932 | Sternemann | Aug. 9, 1932 |
| 2,341,486 | Swertfeger | Feb. 8, 1944 |
| 2,500,914 | Sells et al. | Mar. 14, 1950 |
| 2,680,337 | Whipple | June 8, 1954 |